US012802235B2

(12) United States Patent
Ren et al.

(10) Patent No.: US 12,802,235 B2
(45) Date of Patent: Nov. 17, 2026

(54) IMAGE PROCESSING METHOD, ELECTRONIC DEVICE, AND STORAGE MEDIUM

(71) Applicant: Beijing Zitiao Network Technology Co., Ltd., Beijing (CN)

(72) Inventors: Yuxi Ren, Beijing (CN); Jie Wu, Beijing (CN); Peng Zhang, Beijing (CN); Xuefeng Xiao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 18/725,707

(22) PCT Filed: Jul. 18, 2023

(86) PCT No.: PCT/CN2023/107857

§ 371 (c)(1),
(2) Date: Jun. 28, 2024

(87) PCT Pub. No.: WO2024/017230

PCT Pub. Date: Jan. 25, 2024

(65) Prior Publication Data

US 2025/0078355 A1 Mar. 6, 2025

(30) Foreign Application Priority Data

Jul. 22, 2022 (CN) ......................... 202210873377.2

(51) Int. Cl.
*G06T 7/11* (2017.01)
*G06T 11/60* (2006.01)

(52) U.S. Cl.
CPC ................ *G06T 7/11* (2017.01); *G06T 11/60* (2013.01)

(58) Field of Classification Search
CPC ... G06T 11/60; G06T 3/40; G06T 7/11; G06T 11/40; G06T 19/00; G06T 11/00;
(Continued)

(56) References Cited

U.S. PATENT DOCUMENTS

2017/0132528 A1* 5/2017 Aslan ..................... G06N 20/00
2021/0142450 A1 5/2021 Fan
(Continued)

FOREIGN PATENT DOCUMENTS

CN 109034219 A 12/2018
CN 110796619 A 2/2020
(Continued)

OTHER PUBLICATIONS

Extended European Search Report for European Patent Application No. 23842293.5, mailed on Apr. 2, 2025, 10 pages.
(Continued)

*Primary Examiner* — Gordon G Liu
(74) *Attorney, Agent, or Firm* — Astute IP Law Group

(57) ABSTRACT

Embodiments of the present disclosure provide an image processing method and apparatus, an electronic device, and a storage medium, and the method includes: acquiring an original image to be processed; inputting the original image into a first image processing model; processing the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model; and outputting the target image.

19 Claims, 4 Drawing Sheets

(58) Field of Classification Search

CPC ..... G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06T 2200/24; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G06V 10/764; G06V 10/82; G06V 20/56; G06V 30/1916; G11B 27/10; H04N 21/47217; G16H 30/20; G06N 20/20; G06N 3/045; G06N 3/047; G06N 3/0475; G06N 3/0495; G06N 3/0895; G06N 3/08; G06Q 30/0643; Y02T 10/40

USPC .......................................................... 345/619

See application file for complete search history.

(56) References Cited

U.S. PATENT DOCUMENTS

| | | | | |
|---|---|---|---|---|
| 2022/0083840 | A1 | 3/2022 | Luong et al. | |
| 2023/0132630 | A1 * | 5/2023 | Kang | G06N 3/044<br>706/15 |

FOREIGN PATENT DOCUMENTS

| | | | |
|---|---|---|---|
| CN | 111832605 | A | 10/2020 |
| CN | 111898696 | A | 11/2020 |
| CN | 113298152 | A | 8/2021 |
| CN | 113449851 | A | 9/2021 |
| CN | 113705709 | A | 11/2021 |
| CN | 113920370 | A | 1/2022 |
| CN | 114067119 | A | 2/2022 |
| CN | 114332135 | A | 4/2022 |
| CN | 114373128 | A | 4/2022 |
| CN | 114511743 | A | 5/2022 |
| CN | 114581732 | A | 6/2022 |
| CN | 115936980 | A | 4/2023 |
| CN | 115936980 | B | 10/2023 |
| EP | 3767590 | A1 | 1/2021 |
| JP | 7658038 | B2 | 4/2025 |

OTHER PUBLICATIONS

Decision to Grant a Patent for Japanese Patent Application No. 2024-539479, mailed on Feb. 25, 2025, 5 pages.

Wang, et al., "Knowledge Distillation and Student-Teacher Learning for Visual Intelligence: A Review and New Outlooks", , Cornell University Library, vol. 14, No. 8, Apr. 13, 2020, 40 pages.

Chen et al., "Semi-supervised airplane detection in remote sensing images using generative adversarial networks [J]", Journal of University of Chinese Academy of Sciences, 2020 , vol. 37, No. 4, pp. 539-546 (with English abstract).

International Search Report and Written Opinion received for PCT Patent Application No. PCT/CN2023/107857, mailed on Sep. 2, 2023, 15 pages (6 pages of English Translation and 9 pages of Original copy attached).

Notice of Allowance received for Chinese Patent Application No. 202210873377.2, mailed on Sep. 20, 2023, 6 pages (2 pages of English Translation and 4 pages of Original Document).

Office Action received for Chinese Patent Application No. 202210873377.2, mailed on Jun. 25, 2023, 20 pages (9 pages of English Translation and 11 pages of Original Document).

Ren et al., "Online multi-granularity distillation for GAN compression", 2021 IEEE/CVF International Conference on Computer Vision (ICCV), Oct. 17, 2021, pp. 6793-6803.

XU Yifeng, "The Review of Generative Adversarial Network's Theory Models and Applications", Journal of Jinhua Vocational and Technical College, vol. 17, No. 3, May 2017, pp. 81-88 (with English abstract).

* cited by examiner

IMAGE PROCESSING METHOD, ELECTRONIC DEVICE, AND STORAGE MEDIUM

The present application is a national phase filing of International Patent Application No. PCT/CN2023/107857 filed Jul. 18, 2023, which claims the priority to Chinese Patent Application No. 202210873377.2, filed on Jul. 22, 2022, the disclosures of which are incorporated herein in their entirety.

TECHNICAL FIELD

Embodiments of the present disclosure relate to the technical field of image processing, for example, to an image processing method and apparatus, an electronic device, and a storage medium.

BACKGROUND

Some image generators may generate images of one image domain based on images of another image domain. For example, high resolution images may be generated from low resolution images, etc. Their unique image generation capability has a wide range of application scenarios.

SUMMARY

The embodiments of the present disclosure provide an image processing method and apparatus, an electronic device, and a storage medium.

In a first aspect, the embodiments of the present disclosure provide an image processing method, which includes:

- acquiring an original image to be processed;
- inputting the original image into a first image processing model;
- processing the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model; and
- outputting the target image.

In a second aspect, the embodiments of the present disclosure further provide an image processing apparatus, which includes:

- an image acquisition module, configured to acquire an original image to be processed;
- an input module, configured to input the original image into a first image processing model;
- a generation module, configured to process the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model; and
- an output module, configured to output the target image.

In a third aspect, the embodiments of the present disclosure further provide an electronic device, which includes:

- one or more processors; and
- a storage apparatus, configured to store one or more programs;
- when the one or more programs are executed by the one or more processors, the one or more processors are caused to implement the image processing method according to any one of the embodiments of the present disclosure.

In a fourth aspect, the embodiments of the present disclosure further provide a storage medium including computer-executable instructions, and the computer-executable instructions, when executed by a computer processor, is configured to perform the image processing method according to any one of the embodiments of the present disclosure.

BRIEF DESCRIPTION OF DRAWINGS

Throughout the drawings, the same or similar reference numerals indicate the same or similar elements. It should be understood that the drawings are illustrative and the components and elements are not necessarily drawn to scale.

DETAILED DESCRIPTION

Figure 1:
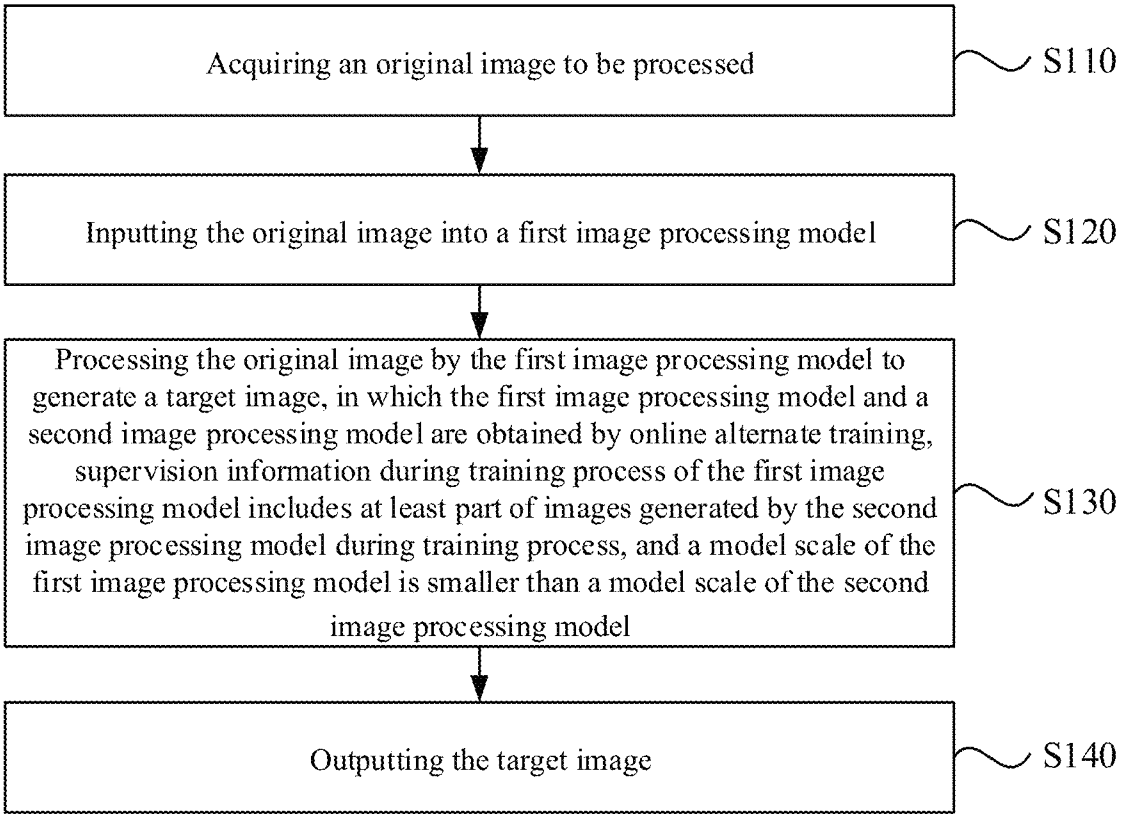
FIG. 1 is a schematic flow diagram of an image processing method provided by the embodiments of the present disclosure.

The training of the image generator requires a large amount of high-quality paired data to guide the network to learn the mapping relationship between different image domains. However, creating paired images is extremely costly as they need to be edited one by one according to image editing instructions, which leads to high production cost of training data.

To cope with the above-mentioned situation, the embodiments of the present disclosure provide an image processing method and apparatus, an electronic device, and a storage medium.

The embodiments of the present disclosure will be described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

It may be understood that the data involved in the embodiments of the present disclosure (including but not limited to the data itself, data acquisition or use) should comply with the requirements of corresponding laws, regulations and relevant provisions.

FIG. 1 is a schematic flow diagram of an image processing method provided by the embodiments of the present disclosure. The embodiments of the present disclosure may perform image processing based on a small-scale model after distilling the small-scale model by a large-scale model. The method may be performed by an image processing apparatus, which may be implemented in the form of software and/or hardware. The apparatus may be configurable in an electronic device, for example in a computer device.

As shown in FIG. 1, the image processing method provided by the present embodiment may include:

S110, acquiring an original image to be processed;

S120, inputting the original image into a first image processing model;

S130, processing the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model;

and S140, outputting the target image.

In the embodiments of the present disclosure, the image processing method may refer to a method of generating a target image of one image domain according to an original image of another image domain. The process of generating the target image according the original image may be performed by a first image processing model.

The first image processing model and the second image processing model may be generators in a Generative Adversarial Networks (GAN), or other generators capable of generating an image of one image domain from an image of another image domain. The model scale of the first image processing model is smaller than the model scale of the second image processing model, which may mean that the model width of the first image processing model (which may also be referred to as the number of channels of the model) is smaller than the model width of the second image processing model, and/or the model depth of the first image processing model (which may also be referred to as the number of network layers of the model) is smaller than the model depth of the second image processing model. It may be considered that the first image processing model is a simple model with a smaller scale, and the second image processing model is a complex model with a larger scale.

In the case of training based on the same true-label data pairs, the training effect of the larger-scale model is generally better than the training effect of the smaller-scale model. That is, when the training is based on the same true-label data pairs, the training effect of the second image processing model is better than the training effect of the first image processing model. By training the first image processing model with at least part of the images generated by the second image processing model as supervision information (i.e., performing model distillation on the first image processing model by the second image processing model), the performance of the first image processing model may be brought closer to the performance of the second image processing model.

The first image processing model may be optimized using only the second image processing model, that is, the supervision information of the first image processing model may all come from the second image processing model. For example, the first image processing model may be optimized using the image generated by the second image processing model based on labeled samples and at least part of pseudo-label images generated based on unlabeled samples as the supervision information. In this training mode, the second image processing model may be referred to as a teacher generator and the first image processing model as a student generator. By performing the model distillation, the model scale compression may be achieved, which facilitates the deployment of the first image processing model with small scale and good performance in devices with limited resources.

When the first image processing model is trained by using the generated image of the second image processing model as the supervision information after the training of the second image processing model is completed, the first image processing model is completely moved from zero to the second image processing model that is trained completely, and training the first image processing model to a level of performance comparable to the second image processing model will take a long time and a large amount of calculation.

In view of this, in the embodiments of the present disclosure, the first image processing model and the second image processing model may be obtained by online alternate training. The online alternate training process, for example, may include that the second image processing model is trained based on the true-label data pairs acquired in the current round; and the first image processing model uses the image generated by the second image processing model after the current training round as the supervision information, to imitate the training process of the second image processing model in the current training round for training. For example, the true-label data pair is a data pair composed of a label sample and a true-label image, where the label sample has the same image domain as that of the original image, and the true-label image has the same image domain as that of the target image.

It may be considered that, during training process of the second image processing model, the first image processing model is distilled once for each iteration of the training, so that the first image processing model may progressively follow the training of the second image processing model. This gradual alternation of training makes it possible to accomplish model distillation from the second image processing model to the first image processing model with a small amount of computation. In the embodiments of the present disclosure, this progressively alternate training method may be referred to as online distillation. In practical applications, training the first image processing model by online distillation may reduce the model computation by 30% compared to distilling the first image processing model after the training of the second image processing model is completed.

In the embodiments of the present disclosure, the training process of the second image processing model may refer to the whole process of the second image processing model from the start of training to the completion of training. During training process of the second image processing model, in addition to being trained according to the true-label data pairs, the second image processing model may also generate a pseudo-label image according to an unlabeled sample. Here, the image domain of the unlabeled sample is the same as the image domain of the original sample, and the image domain of the pseudo-labeled image is the same as the image domain of the target image. That is, the first image processing model may be independently trained based on at least part of the pseudo-label images, in addition to being trained following each iteration of the second image processing model. Thus, it is possible to enlarge the amount of training data of the first image processing model and improve the generalization of the first image processing model without paying the additional production cost of paired data.

Although the pseudo-label image may provide the supervision information for the first image processing model, it may not provide the supervision information for the second image processing model. That is, the first image processing model may be trained based on the pseudo-label image, but the second image processing model may not be trained based on the pseudo-label image. After the first image processing model is trained independently based on the pseudo-label image, the performance may deviate. Thus, independent training may be based on part of the better-quality pseudo-label images to reduce this performance deviation. However, if the training is based on all the pseudo-label images, because the pseudo-label images in the embodiments of the present disclosure are generated during training process of the second image processing model, the first image processing model will continue to follow the training of the second image processing model when the second image processing model generates the pseudo-label image and then is trained based on the true-label data pairs again. Therefore, the deviation caused by the pseudo label to the first image processing model may also be corrected in time, and the image generation quality of the first image processing model may also be ensured, to achieve the effect of reducing cost and increasing efficiency. The first image processing model thus obtained ensures excellent image processing performance while achieving lightweight.

In the embodiments of the present disclosure, the first image processing model is applied to a lightweight terminal device. The lightweight terminal device may be a terminal device with limited resources, for example, a terminal device such as a mobile phone. Due to the small model scale, the generalization of the model and the good quality of the generated images of the first image processing model with the training completed, it effectively reduces the deployment difficulty of the model on resource-constrained mobile terminal devices or other lightweight devices of the Internet of Things. The first image processing model, which has been trained, may generate high-quality target images based on the original image.

The embodiments of the present disclosure enable collaborative compression of model dimension and training data dimension during GAN training process as follows.

By alternately training the second image processing model and the first image processing model by online distillation, the first image processing model may be gradually guided to learn the optimization process of the second image processing model, so that the first image processing model may output images with quality similar to the second image processing model with less computation, and the model dimension compression is completed.

During training process of the second image processing model, a large number of unlabeled samples are introduced to generate pseudo-label images, and the first image processing model is trained based on at least part of the pseudo-label images, so that the traditional way of training based on the true-label data pairs may be transformed into the way of training based on the true-label data pairs in cooperation with the pseudo-label images, thereby completing the compression of requirements of the true-label data pairs, i.e., completing the compression of the dimension of training data. The pseudo-label images may bring additional supervision information for the training of the first image processing model, which is possible to enlarge the amount of training data of the first image processing model and improve the generalization of the first image processing model without paying the additional production cost of paired data. It is more conducive for the model to learn the structural features of the image domain of the image to be generated.

In the embodiments of the present disclosure, the first image processing model is a smaller-scale model and the second image processing model is a larger-scale model. In the case of training based on the same true-label data pairs, the training effect of the larger-scale model is generally better than the training effect of the smaller-scale model. The first image processing model and the second image processing model are trained alternately in an online way, and the first image processing model is trained by using the images generated in the training process of the second image processing model as the supervision information, so that the first image processing model may simulate each iteration of the training process of the second image processing model, and progressively follow the training. By progressively following the training, the model distillation from the second image processing model to the first image processing model may be achieved with a small amount of computation, bringing the performance of the first image processing model closer to the performance of the second image processing model.

The second image processing model may generate pseudo-label images based on the unlabeled samples in addition to training based on the true-label data pairs during training process. That is, in addition to following each iteration training process of the second image processing model, the first image processing model may also perform independent training based on at least part of the pseudo-label images, to enlarge the amount of training data of the first image processing model and improve the generalization of the first image processing model without paying the additional production cost of paired data.

Because the pseudo-label image can provide supervision information for the training of the first image processing model, but cannot provide supervision information for the training of second image processing model, the performance of the first image processing model may deviate after training based on the pseudo-label image. However, because the pseudo-label image is generated during the training of the second image processing model, the first image processing model will continue to follow the training of the second image processing model when the second image processing model generates the pseudo-label image and then is trained based on the true-label data pairs again. Therefore, the deviation introduced by the pseudo label to the first image processing model may be corrected in time to ensure the image generation quality of the first image processing model, and to achieve the effect of reducing cost and increasing efficiency.

The embodiments of the present disclosure may be combined with examples of the image processing methods provided in the above-mentioned embodiments. The second image processing model may be trained based on true-label data pairs during training process and generate a pseudo-label image based on an unlabeled sample. In the image processing method provided in the present embodiment, the generation process of the pseudo-label image is described. By utilizing the second image processing model trained on current true-label data to generate pseudo-label data based on unlabeled data, it is possible to provide additional supervision information for the training of the first image processing model.

Figure 2:
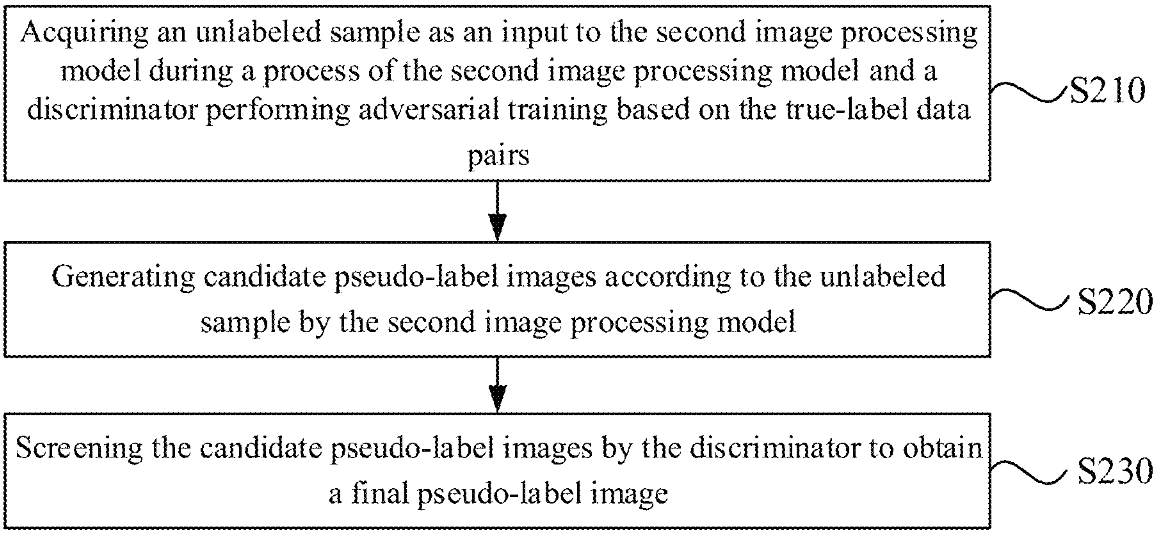
FIG. 2 is a schematic flow diagram of generating a pseudo-label image in an image processing method provided by the embodiments of the present disclosure.

FIG. 2 is a schematic flow diagram of generating a pseudo-label image in an image processing method provided by the embodiments of the present disclosure. As shown in FIG. 2, in the image processing method provided by the present embodiment, the pseudo-label image may be generated based on the following steps.

Step S210, acquiring an unlabeled sample as an input to the second image processing model during a process of the second image processing model and a discriminator performing adversarial training based on the true-label data pairs.

Figure 3:
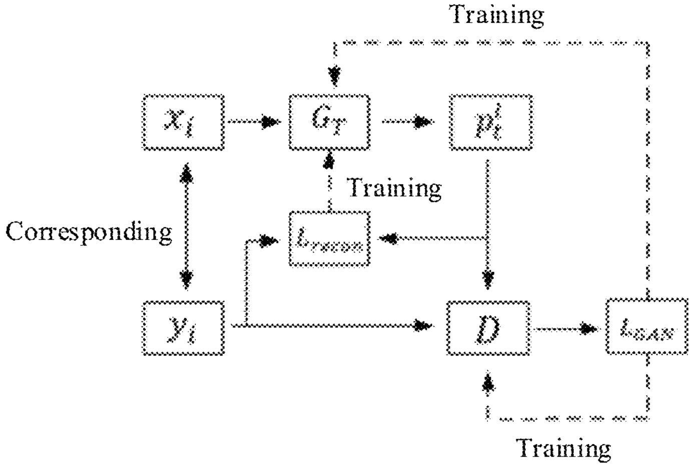
FIG. 3 is a schematic diagram of a training framework for a second image processing model in an image processing method provided by the embodiments of the present disclosure.

In an embodiment of the present disclosure, the second image processing model may be a generator in GAN, and may perform adversarial training together with the discriminator in GAN. Exemplarily, FIG. 3 is a schematic diagram of a training framework for a second image processing model in an image processing method provided by the embodiments of the present disclosure. Referring to FIG. 3, in some implementations, the second image processing model and the discriminator performing the adversarial training based on the true-label data pairs may includes:

acquiring a labeled sample $x_i$ among true-label data pairs $$U_l = \{x_i, y_i\}_{i=1}^{N}$$

as an input of a second image processing model $G_T$; generating a first image $$p_t^l$$

according to the labeled sample $x_i$ by the second image processing model $G_T$; acquiring a true-label image $y_i$ corresponding to the labeled sample $x_i$ among the true-label data pairs $$U_l = \{x_i, y_i\}_{i=1}^{N};$$

determining whether the first image $$p_t^l$$

and the true-label image $y_i$ are of the same type by the discriminator D; training the second image processing model with a goal of being determined as the same type by the discriminator; and training the discriminator with a goal of being determined as different types by the discriminator.

i is a positive integer, and N represents the number of true-label data pairs.

The true-label data pairs $$U_l = \{x_i, y_i\}_{i=1}^{N}$$

are used to supervise the training of the second image processing model Gr. For example, the second image processing model Gr and the discriminator D may be trained with generation adversarial loss $L_{GAN}(G_T, D)$. The second image processing model $G_T$ is trained to map $x_i$ to $y_i$, and the discriminator D is trained to distinguish the image $p_t$ generated by $G_T$ from the true-label image $y_i$. Here, the generation adversarial loss may be represented by the following formula:

$$L_{GAN}(G_T, D) = \mathbb{E}_{x,y}[\log D(x, y)] + \mathbb{E}_x[\log(1 - D(x, G_T(x)))];$$

where x is each labeled sample; y is each true-label image; $G_T(x)$ is each first image $$p_t^l$$

generated by the second image processing model according to each label sample; $\mathbb{E}_{x,y}[\ ]$ may represent an expectation function under the data (x, y); and $\mathbb{E}_x[\ ]$ may represent an expectation function under the data x.

Referring again to FIG. 3, the process of the second image processing model $G_T$ and the discriminator D performing the adversarial training based on the true-label data pairs $$U_l = \{x_i, y_i\}_{i=1}^{N}$$

may further include: determining a reconstruction loss $L_{recon}$ according to the first image $$p_t^l$$

and the true-label image y; and training the second image processing model $G_T$ according to the reconstruction loss $L_{recon}$.

Here, the reconstruction loss $L_{recon}$ may be represented by the following formula:

$$L_{recon}(G_T, D) = \mathbb{E}_{(x,y)}[y - G_T(x)],$$

where the meaning of the same characters may be referred to above. By training the second image processing model based on the reconstruction loss, the output of the second image processing model may be made close to the true-label image.

In this case, the complete optimization loss function of the second image processing model $G_T$ may be represented by the following formula:

$$G_T = \arg\min_{G_T}\max_{D} L_{GAN}(G_T, D) + L_{recon}(G_T, D).$$

During the process of the second image processing model and the discriminator performing the adversarial training based on the true-label data pairs, acquiring an unlabeled sample as an input of the second image processing model may include, for example, acquiring an unlabeled sample as an input of the second image processing model, at the interval of the adversarial training based on the true-label data pairs. For example, acquiring the unlabeled sample may be randomly selecting an unlabeled sample from an unlabeled sample set. Here, the number of the unlabeled sample acquired at each time may be at least one. Because the acquisition of unlabeled samples occurs at the interval of the adversarial training, i.e., the second image processing model may continue the adversarial training after the generation of candidate pseudo-labels. That is, the first image processing model may continue to imitate the optimization process of the second image processing model after being trained based on the pseudo-label image, so that not only the generalization of the first image processing model may be improved, but also the possible deviation introduced by the pseudo-label image may be compensated to ensure the performance of the first image processing model.

In some implementations, it is also possible to acquire the unlabeled sample as an input of the second image processing model at intervals before performing the adversarial training based on the remaining proportion of true-label data pairs, after performing successive adversarial training based on a predetermined proportion (e.g., one-third, one-half, etc.) of true-label data pairs. By initially performing warm-up training based on a predetermined proportion of true-label data pairs, the pseudo-label image generated by the second image processing model may be more consistent with the structural features of the image domain of the image to be generated, which may provide better supervision information for the first image processing model to a certain extent.

In some implementations, during the process of the second image processing model and the discriminator performing the adversarial training based on the true-label data pairs, acquiring an unlabeled sample as an input of the second image processing model may include: acquiring the unlabeled sample as the input to the second image processing model, after the second image processing model and the discriminator performing adversarial training with a preset number of true-label data pairs being acquired every time.

In these implementations, acquiring the unlabeled sample at intervals of the adversarial training based on the true-label data pairs may be acquiring the unlabeled sample after performing adversarial training with a preset number of true-label data pairs (e.g., 1, 2, etc.) being acquired every time. Here, the preset number is inversely related to the degree of compression of the training data of the first image processing model. For example, if one unlabeled sample is acquired to generate candidate pseudo-label images after every acquisition of one true-label data pair for adversarial training, the required amount of 50% true-label data pairs may be compressed for the first image processing model in the case where the candidate pseudo-label images are all used for training the first image processing model; and if one unlabeled sample is acquired to generate candidate pseudo-labeled images after every two true-label data pairs are acquired for adversarial training, the required amount of 33% true-label data pairs may be compressed for the first image processing model in the case where the candidate pseudo-label images are all used for training the first image processing model. On the other hand, a reduced preset number may also introduce a slightly larger amount of computation for the training process of the first image processing model simulating the second image processing model. Therefore, the preset number may be set according to the actual situation to balance the compression amount of training data and the calculation amount of training of the first image processing model.

S220, generating candidate pseudo-label images according to the unlabeled sample by the second image processing model.

In this embodiment, the second image processing model may generate candidate pseudo-label images according to the unlabeled sample based on the current model parameters in the training. After generating the pseudo-label images according to the acquired unlabeled sample, the second image processing model may continue to perform adversarial training based on the true-label data pairs. The second image processing model continues to be optimized based on the supervision information provided by the true-label data pairs, so that the first image processing model continues to imitate the optimization process of the second image processing model.

S230, screening the candidate pseudo-label images by the discriminator to obtain a final pseudo-label image.

After the unlabeled samples $$x_j^u$$

acquired from an unlabeled sample set $$U_u = \{x_j\}_{j=1}^M$$

are input into the second image processing model $G_T$, a candidate pseudo-labeled image $$p_t^u$$

may be generated by the second image processing model $$G_T, \text{ i.e., } p_t^u = G_T(x_j^u).$$

Because the second image processing model $G_T$ has not acquired supervision information related to $$x_j^u,$$

the quality of $$p_t^u$$

corresponding to different $$x_j^u$$

is uneven.

j is a positive integer and M represents the number of unlabeled samples.

Because there is a discriminator D against the second image processing model $G_T$ in the training process of the second image processing model $G_T$, the discriminator D can well judge the quality of the generated image of the current second image processing model $G_T$. For each candidate pseudo-label image $$p_t^u,$$

the quality of $$p_t^u$$

is higher if the discriminator D considers the image to be close to a real image, and the quality of $$p_t^u$$

is lower if the discriminator D discriminates that $$p_t^u$$

is not a real image.

In this embodiment, a pseudo-label image with a higher image quality may be selected from a large number of candidate pseudo-labels by the discriminator to be sent into the first image processing model for training. Here, the screened high-quality pseudo-label image may be immediately input into the first image processing model for training, and may also be non-immediately input into the first image processing model for training. For example, it may be input once into the first image processing model for training after accumulating a certain number of pseudo-label images. The timing of inputting the pseudo-label image is not strictly limited here, and other ways of inputting the pseudo-label image into the first image processing model may be applied here, which is not exhaustive here.

In some implementations, screening the candidate pseudo-label images by the discriminator may include: performing authenticity evaluation on the candidate pseudo-label images by the discriminator to obtain an evaluation result; and screening the candidate pseudo-label images according to a preset evaluation criteria and the evaluation result.

Here, the authenticity evaluation is performed on the candidate pseudo-label image $$p_t^u$$

using the discriminator D to obtain an evaluation score $$S_t^u,$$

where $$S_t^u = D(x_j^u, G_T(x_j^u)).$$

The evaluation criteria may be a preset threshold value $\lambda_{thre}$. Screening the candidate pseudo-label images $$p_t^u$$

according to $\lambda_{thre}$ and $$S_t^u$$

may include taking the candidate pseudo-label image with $$S_t^u$$

being greater than $\lambda_{thre}$ as the pseudo-label image input to the first image processing model, and discarding and disusing the candidate pseudo-label image with $S_t^u$ being lower than $\lambda_{thre}$, so that the training data quantity of the first image processing model is enlarged while the quality of the training data is guaranteed.

In these implementations, in order to ensure the quality of the pseudo-label image, the discriminator may be used to perform data screening on the candidate pseudo-label images, and the selected high-quality pseudo-label image may improve the generalization of the student generator. This screening method helps to mine the structured features of unlabeled samples in the same style, and can be complementary with the true-label data pairs to train the first image processing model, thus reducing the expensive and time-consuming training data generation and selection steps, and reducing cost and increasing efficiency.

The embodiments of the present disclosure describe the generation process of the pseudo-label image. Providing additional supervision information for the training of the first image processing model may be achieved by generating the pseudo-label data based on the unlabeled data by using the second image processing model trained on the current true-label data. The image processing method provided by the embodiments of the present disclosure belongs to the same disclosed concept as the image processing method provided by the above-mentioned embodiments. The technical details that are not described in detail in the present embodiment may be referred to the above-mentioned embodiments, and the same technical features have the same advantageous effects in the present embodiment and the above-mentioned embodiments.

The embodiments of the present disclosure may be combined with examples of image processing methods provided by the above-mentioned embodiments. The image processing method provided by the present embodiment describes training steps of the first image processing model. During training process of the first image processing model, the training may be performed not only with the first image generated by the second image processing model according to the labeled samples as the supervision information, but also with at least part of the pseudo-labeled images generated by the second image processing model according to the unlabeled samples as the supervision information. The generalization of the first image processing model and the quality of the generated image may be improved by training the first image processing model with the labeled distillation loss for the first image and the unlabeled distillation loss for the pseudo-label image between the first image processing model and the second image processing model.

Figure 4:
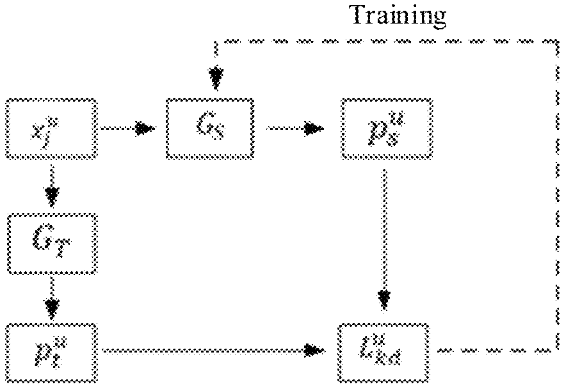
FIG. 4 is a schematic diagram of a training framework in which a first image processing model uses a pseudo-label image as supervision information in an image processing method provided by the embodiments of the present disclosure.

Exemplarily, FIG. 4 is a schematic diagram of a training framework in which a first image processing model uses a pseudo-label image as supervision information in an image processing method provided by the embodiments of the present disclosure. Referring to FIG. 4, in some implementations, when the first image processing model takes the pseudo-label image as the supervision information, the first image processing model is trained based on steps including:

acquiring an unlabeled sample $x_j^u$ corresponding to the pseudo-label image $p_t^u$ as an input of a first image processing model $G_S$; generating a second image $G_S$ according to the unlabeled sample $x_j^u$ by the first image processing model $G_S$; determining a distillation loss (which may be referred to as an unlabeled distillation loss $L_{kd}^u$)

) according to the pseudo-label image $p_t^u$ and the second image $p_s^u$;

and training the first image processing model according to the distillation loss $L_{kd}^u$.

Here, the reconstruction loss between the pseudo-label image $p_t^u$ and the second image $p_s^u$ may be taken as the distillation loss $L_{kd}^u$;

and/or, in some implementations, determining the distillation loss according to the pseudo-label image $p_t^u$ and the second image $$p_s^u$$

may include: determining a perceptual loss $L_{preu}$ according to a feature image $$\phi_j(p_t^u)$$

during the process of generating the pseudo-label image $$p_t^u$$

by the second image processing model $G_T$ and a feature image $$\phi_j(p_s^u)$$

during the process of generating the second image $$p_s^u$$

by the first image processing model $G_S$; and taking the perceptual loss $L_{preu}$ as the distillation loss $$L_{kd}^u.$$

When the perceptual loss $L_{preu}$ is used to measure a difference between the pseudo-label image $$p_t^u$$

and the second image $$p_s^u,$$

the perceptual loss $L_{preu}$ may include at least one of a feature reconstruction loss $L_{fea}$ and a style reconstruction loss $L_{style}$.

The feature reconstruction loss $L_{fea}$ may encourage $$p_t^u$$

and $$p_s^u$$

to have similar feature representations that may be obtained from $\phi$ metric of a pre-trained network, for example from $\phi$ metric of a Visual Geometry Group (VGG) network. The feature reconstruction loss $L_{fea}$ may be defined as follows:

$$L_{fea}(p_t^u, p_s^u) = \frac{1}{c_j H_j W_j} \|\phi_j(p_t^u) - \phi_j(p_s^u)\|_1,$$

where $\phi_j(x)$ represents an activation value (that is, a feature image) of x at a $j^{th}$ layer of the VGG network; $\|\bullet\|_1$ represents a one-dimensional norm; and $C_j \times H_j \times W_j$ represents a dimension of $\phi_j(x)$.

$C_j$ represents the number of channel; $H_j$ represents the height; and $W_j$ represents the width.

The style reconstruction loss $L_{style}$ is introduced to penalize differences of $$p_t^u \text{ and } p_s^u$$

in style features, such as differences in color, texture, generic patterns, etc. Here, the style reconstruction loss $L_{style}$ may be defined as:

$$L_{style}(p_t^u, p_s^u) = \left\|G_j^{\phi}(p_t^u) - G_j^{\phi}(p_s^u)\right\|_1,$$

in the formula, $$G_j^{\phi}(x)$$

represents a feature after the activation value of x in a $j^{th}$ layer of the VGG network is extracted by the Gram matrix.

It may be considered that the unlabeled distillation loss may include a reconstruction loss and/or a perceptual loss between the pseudo-label image and the second image. When the unlabeled distillation loss includes a reconstruction loss and a perceptual loss, the unlabeled distillation loss may be a sum or a weighted sum of the both, etc.

Further, in some implementations, the first image processing model $G_S$ is trained based on steps, which further include determining a total variation loss according to the second image $$p_s^u;$$

accordingly, training the first image processing model according to the distillation loss $$L_{kd}^u$$

may include training the first image processing model $G_S$ according to the distillation loss $$L_{kd}^u$$

and the total variation loss $L_{tv}$.

Here, the spatial smoothness of the output image of the first image processing model $G_S$ may be improved by introducing the total variation loss $L_{tv}$. Three hyperparameters $\lambda_{fea}$, $\lambda_{style}$ and $\lambda_{tv}$ may be used to achieve a balance between the above losses, where the overall unlabeled distillation loss $$L_{kd}^{u}(p_t^u, p_s^u)$$

may be defined as follows:

$$L_{kd}^{u}(p_t^u, p_s^u) = \lambda_{fea}L_{fea} + \lambda_{style}L_{style} + \lambda_{tv}L_{tv};$$

where $\lambda_{fea}$, $\lambda_{style}$ and $\lambda_{tv}$ represent the weights of feature reconstruction loss $L_{fea}$, style reconstruction loss $L_{style}$ and total variation loss $L_{tv}$, respectively.

In some implementations, the images generated by the second image processing model $G_T$ during training process may further include a first image $$p_t^l$$

generated by the second image processing model $G_T$ according to a labeled sample $x_i$ among the true-label data pair $$U_l = \{x_i, y_i\}_{i=1}^{N}.$$

Figure 5:
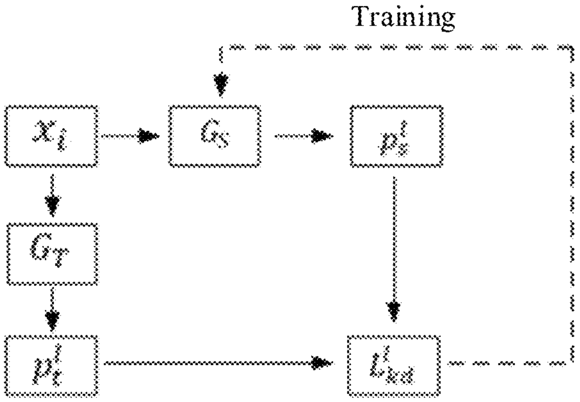
FIG. 5 is a schematic diagram of a training framework in which a first image processing model uses a first image as supervision information in an image processing method provided by the embodiments of the present disclosure.

Exemplarily, FIG. 5 is a schematic diagram of a training framework in which a first image processing model $G_S$ uses the first image $$p_t^l$$

as supervision information in an image processing method provided by an embodiment of the present disclosure. Referring to FIG. 5, when the first image processing model $G_S$ takes the first image $$p_t^l$$

as the supervision information, the first image processing model $G_S$ is trained based on the steps including:

acquiring a labeled sample $x_i$ corresponding to the first image $$p_t^l$$

as an input of the first image processing model $G_S$; generating a third image $$p_s^l$$

according to the labeled sample $x_i$ by the first image processing model; determining a distillation loss (which may be referred to as a labeled distillation loss $$L_{kd}^{l})$$

according to the first image $$p_t^l$$

and the third image $$p_s^l;$$

and training the first image processing model $G_S$ according to the distillation loss $$L_{kd}^{l}.$$

Here, the calculation process of the labeled distillation loss $$L_{kd}^{l}$$

may refer to the calculation process of the unlabeled distillation loss $$L_{kd}^{u}.$$

Here, the labeled distillation loss $$L_{kd}^{l}$$

may also include a reconstruction loss and/or a perceptual loss between the first image $$p_t^l$$

and the third image $$p_s^l.$$

The perceptual loss may also include at least one of a feature reconstruction loss $L_{fea}$ and a style reconstruction loss $L_{style}$. Furthermore, the first image processing model $G_S$ may be trained according to the labeled distillation loss $$L_{kd}^{l}$$

and the total variation loss $L_{tv}$ of the third image $p_s^l$.

When the training process of the first image processing model $G_S$ includes both the labeled distillation loss $L_{kd}^l$ and the unlabeled distillation loss $L_{kd}^u$, the total distillation loss $L_{kd}$ of the first image processing model may be defined as:

$$L_{kd} = L_{kd}^l + \lambda_{unlabeled} \times L_{kd}^u,$$

where, $\lambda_{unlabeled}$ represents a ratio of the contribution to the loss value of the labeled sample to the unlabeled sample.

Figure 6:
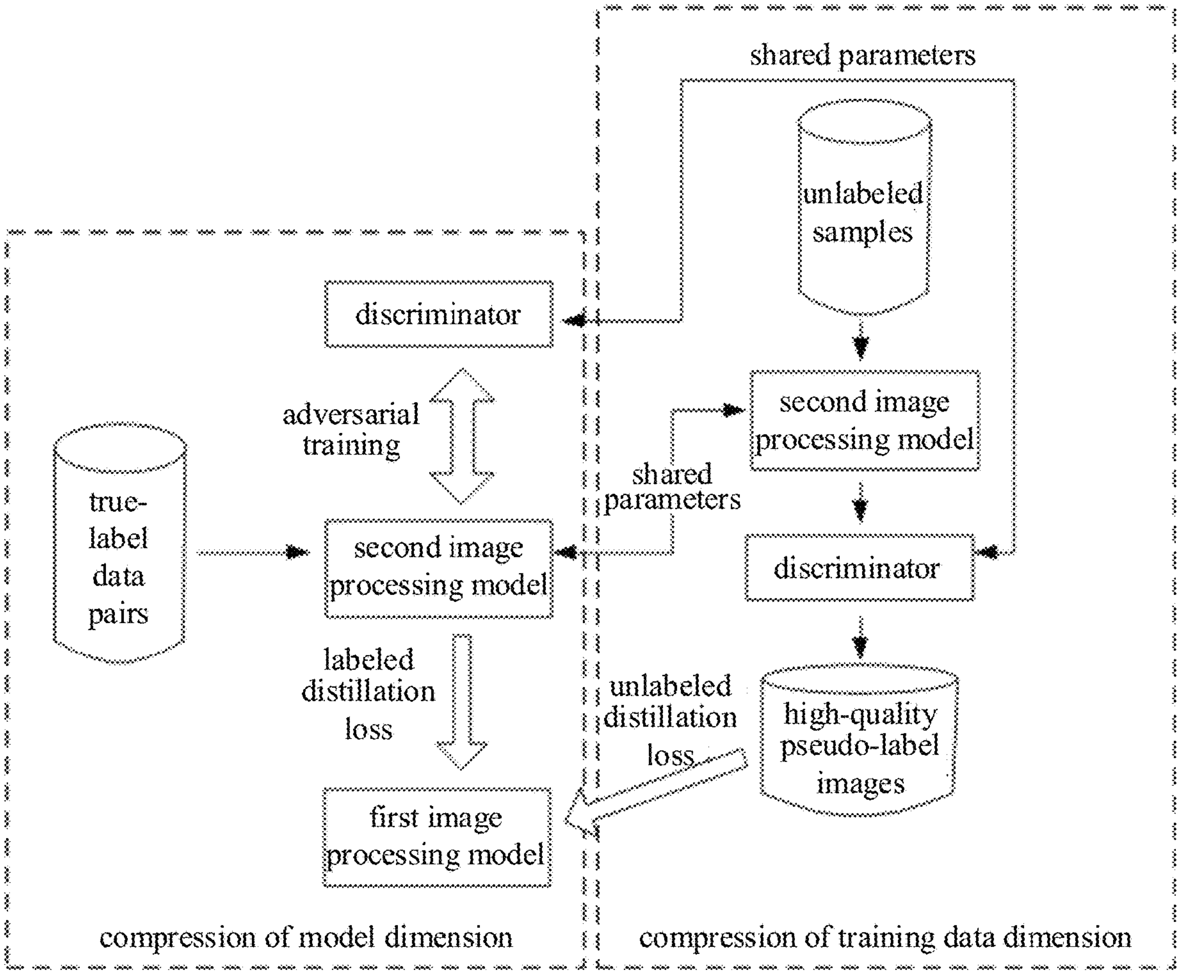
FIG. 6 is a schematic diagram of a general training framework of a first image processing model in an image processing method provided by the embodiments of the present disclosure.

Exemplarily, FIG. 6 is a schematic diagram of a general training framework of a first image processing model in an image processing method provided by the embodiments of the present disclosure. Referring to FIG. 6, during training process of the first image processing model, the cooperative compression of both the model dimension and the training data dimension is achieved.

Referring to FIG. 6, the second image processing model and the discriminator may perform adversarial training based on the true-label data pairs. Moreover, with each iteration and optimization of the second image processing model, the first image processing model may be guided through the labeled distillation loss to imitate the optimization process of the second image processing model, thereby realizing the online distillation of the first image processing model. The first image processing model may be referred to as a student generator and the second image processing model may be referred to as a teacher generator. Online distillation may achieve the compression of model dimension, which facilitates the deployment of the first image processing model with small scale and good performance in devices with limited resources.

The second image processing model may also acquire unlabeled samples to generate candidate pseudo-labeled images during the adversarial training process. Furthermore, the candidate pseudo-label images may be screened by the discriminator to obtain the high-quality pseudo-label images. The screened pseudo-label image may introduce the unlabeled distillation loss to the first image processing model to train the first image processing model. By generating the pseudo-label image, the amount of training data of the first image processing model may be enlarged without additional production cost of paired data, so that the dimension of training data may be compressed, and the generalization of the first image processing model may be improved.

In the embodiments of the present disclosure, the training steps of the first image processing model are described. During training process of the first image processing model, the training may be performed not only with the first image generated by the second image processing model according to the labeled samples as the supervision information, but also with the pseudo-labeled images generated by the second image processing model according to the unlabeled samples as the supervision information. The generalization of the first image processing model and the quality of the generated image may be improved by training the first image processing model with the labeled distillation loss for the first image and the unlabeled distillation loss for the pseudo-label image between the first image processing model and the second image processing model. The image processing method provided by the embodiments of the present disclosure belongs to the same disclosed concept as the image processing method provided by the above-mentioned embodiments. The technical details that are not described in detail in the present embodiment may be referred to the above-mentioned embodiments, and the same technical features have the same advantageous effects in the present embodiment and the above-mentioned embodiments.

Figure 7:
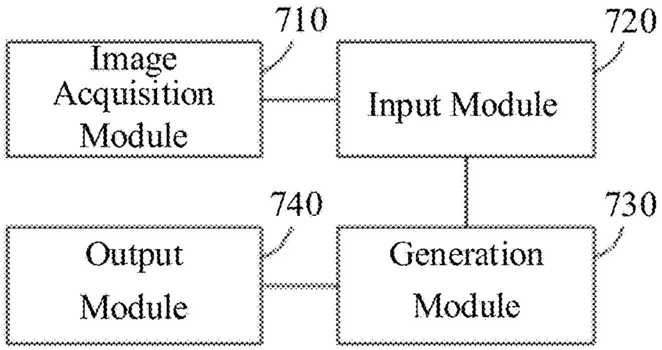
FIG. 7 is a schematic structural diagram of an image processing apparatus provided by the embodiments of the present disclosure.

FIG. 7 is a schematic structural diagram of an image processing apparatus provided by the embodiments of the present disclosure. The image processing apparatus provided by the present embodiment can perform image processing based on a small-scale model after distilling the small-scale model by a large-scale model.

As shown in FIG. 7, the image processing apparatus provided by the embodiments of the present disclosure may include:

- an image acquisition module 710 configured to acquire an original image to be processed;
- an input module 720 configured to input the original image into a first image processing model;
- a generation module 730 configured to process the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model;
- and an output module 740 configured to output the target image.

In some implementations, the second image processing model is trained based on true-label data pairs during training process, and a pseudo-label image is generated according to an unlabeled sample. Accordingly, the image processing apparatus may include a model training module, and the model training module may include a pseudo-label generation unit.

The pseudo-label generation unit may be configured to generate the pseudo-label image based on steps including:

- acquiring an unlabeled sample as an input to the second image processing model during a process of the second image processing model and a discriminator performing adversarial training based on the true-label data pairs;
- generating candidate pseudo-label images according to the unlabeled sample by the second image processing model;
- and screening the candidate pseudo-label images by the discriminator to obtain a final pseudo-label image.

In some implementations, the pseudo-label generation unit may be configured to:

- acquire the unlabeled sample as the input to the second image processing model, after the second image processing model and the discriminator performing adversarial training with a preset number of true-label data pairs being acquired every time.

In some implementations, the pseudo-label generation unit may be configured to:

perform authenticity evaluation on the candidate pseudo-label images by the discriminator to obtain an evaluation result;

and screen the candidate pseudo-label images according to a preset evaluation criteria and the evaluation result.

In some implementations, the model training module may include a second image processing model training unit.

The second image processing model training unit may be configured to perform adversarial training on the second image processing model and the discriminator based on the true-label data pairs.

The second image processing model training unit may be configured to:

acquire a labeled sample among the true-label data pairs as the input to the second image processing model;

generate a first image according to the labeled sample by the second image processing model;

acquire a true-label image corresponding to the labeled sample among the true-label data pairs;

determine whether the first image and the true-label image are of a same type by the discriminator;

train the second image processing model with a goal of being determined as the same type by the discriminator;

and train the discriminator with a goal of being determined as different types by the discriminator.

In some implementations, the second image processing model training unit may further be configured to:

determine a reconstruction loss according to the first image and the true-label image;

and train the second image processing model according to the reconstruction loss.

In some implementations, the model training module may include a first image processing model training unit.

If the first image processing model takes the pseudo-label image as the supervision information, the first image processing model training unit may be configured to train the first image processing model based on the steps including:

acquiring an unlabeled sample corresponding to the pseudo-label image as an input of the first image processing model;

generating a second image according to the unlabeled sample by the first image processing model;

determining a distillation loss according to the pseudo-label image and the second image;

and training the first image processing model according to the distillation loss.

In some implementations, the first image processing model training unit may be configured to:

determine a perceptual loss according to a feature image during a process of generating the pseudo-label image by the second image processing model and a feature image during a process of generating the second image by the first image processing model;

and take the perceptual loss as the distillation loss.

In some implementations, the perceptual loss includes at least one of a feature reconstruction loss and a style reconstruction loss.

In some implementations, the first image processing model training unit may further be configured to:

determine a total variation loss according to the second image;

accordingly, training the first image processing model according to the distillation loss includes training the first image processing model according to the distillation loss and the total variation loss.

In some implementations, the images generated by the second image processing model during training process further include:

a first image generated by the second image processing model according to a labeled sample among the true-label data pairs;

if the first image processing model takes the first image as the supervision information, the first image processing model training unit may be configured to train the first image processing model based on the steps including:

acquiring a labeled sample corresponding to the first image as an input of the first image processing model;

generating a third image according to the labeled sample by the first image processing model;

determining a distillation loss according to the first image and the third image;

and training the first image processing model according to the distillation loss.

The image processing apparatus provided by the embodiments of the present disclosure may execute the image processing method provided by any embodiment of the present disclosure, and has functional modules and advantageous effects corresponding to the execution method.

It should be noted that the respective units and modules included in the above-mentioned apparatus are divided only according to the functional logic, but are not limited to the above-mentioned division as long as the corresponding functions can be realized. In addition, the specific names of the functional units are merely for convenience of mutual distinction and are not intended to limit the protect scope of the embodiments of the present disclosure.

Figure 8:
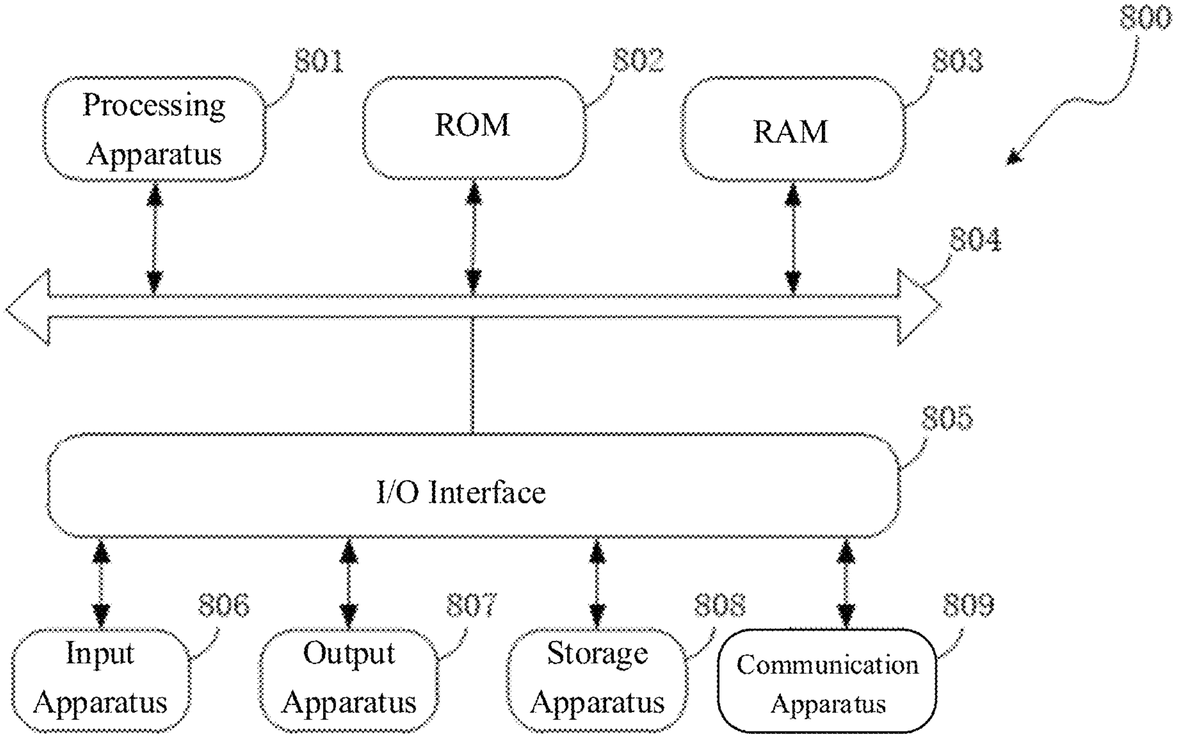
FIG. 8 is a schematic structural diagram of an electronic device provided by the embodiments of the present disclosure.

Referring to FIG. 8, FIG. 8 illustrates a schematic structural diagram of an electronic device 800 (for example, a terminal device or a server) suitable for implementing the embodiments of the present disclosure. The electronic devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and fixed terminals such as a digital TV, a desktop computer, or the like. The electronic device illustrated in FIG. 8 is merely an example, and should not pose any limitation to the functions and the range of use of the embodiments of the present disclosure.

As illustrated in FIG. 8, the electronic device 800 may include a processing apparatus 801 (e.g., a central processing unit, a graphics processing unit, etc.), which can perform various suitable actions and processing according to a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are interconnected through a bus 804. An input/output (I/O) interface 805 is also connected to the bus 804.

Usually, the following apparatuses may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the electronic device 800 to be in wireless or wired communication with other devices to exchange data. While FIG. 8 illustrates the electronic device 800 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of some embodiments of the present disclosure are performed.

The electronic device provided by the embodiments of the present disclosure belongs to the same disclosed concept as the image processing method provided by the above-mentioned embodiments. The technical details that are not described in detail in the present embodiment may be referred to the above-mentioned embodiments, and the present embodiment has the same advantageous effects as the above-mentioned embodiments.

The embodiments of the present disclosure further provide a computer storage medium, on which a computer program is stored, and the computer program, when executed by a processor, implements the image processing method provided by the above-mentioned embodiments.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

acquire an original image to be processed; input the original image into a first image processing model; process the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model; and output the target image.

The storage medium may be a non-transitory storage medium.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

One or more embodiments of the present disclosure provide an image processing method, and the method includes:

acquiring an original image to be processed;

inputting the original image into a first image processing model;

processing the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model;

and outputting the target image.

One or more embodiments of the present disclosure provide an image processing method, and the method further includes:

in some implementations, the second image processing model is trained based on true-label data pairs during training process, a pseudo-label image is generated according to an unlabeled sample, and the pseudo-label image is generated based on steps including:

acquiring an unlabeled sample as an input to the second image processing model during a process of the second image processing model and a discriminator performing adversarial training based on the true-label data pairs;

generating candidate pseudo-label images according to the unlabeled sample by the second image processing model;

and screening the candidate pseudo-label images by the discriminator to obtain a final pseudo-label image.

One or more embodiments of the present disclosure provide an image processing method, and the method further includes:

in some implementations, acquiring the unlabeled sample as the input to the second image processing model during the process of the second image processing model and the discriminator performing the adversarial training based on the true-label data pairs, includes:

acquiring the unlabeled sample as the input to the second image processing model, after the second image processing model and the discriminator performing adversarial training with a preset number of true-label data pairs being acquired every time.

One or more embodiments of the present disclosure provide an image processing method, and the method further includes:

in some implementations, screening the candidate pseudo-label images by the discriminator includes:

performing authenticity evaluation on the candidate pseudo-label images by the discriminator to obtain an evaluation result;

and screening the candidate pseudo-label images according to a preset evaluation criteria and the evaluation result.

One or more embodiments of the present disclosure provide an image processing method, and the method further includes:

in some implementations, the second image processing model and the discriminator performing the adversarial training based on the true-label data pairs includes:

acquiring a labeled sample among the true-label data pairs as the input to the second image processing model;

generating a first image according to the labeled sample by the second image processing model;

acquiring a true-label image corresponding to the labeled sample among the true-label data pairs;

determining whether the first image and the true-label image are of a same type by the discriminator;

training the second image processing model with a goal of being determined as the same type by the discriminator;

and training the discriminator with a goal of being determined as different types by the discriminator.

One or more embodiments of the present disclosure provide an image processing method, and the method further includes:

in some implementations, during the process of the second image processing model and the discriminator performing the adversarial training based on the true-label data pairs, further including:

determining a reconstruction loss according to the first image and the true-label image;

and training the second image processing model according to the reconstruction loss.

One or more embodiments of the present disclosure provide an image processing method, and the method further includes:

in some implementations, if the first image processing model takes the pseudo-label image as the supervision information, the first image processing model is trained based on steps including:

acquiring an unlabeled sample corresponding to the pseudo-label image as an input of the first image processing model;

generating a second image according to the unlabeled sample by the first image processing model;

determining a distillation loss according to the pseudo-label image and the second image;

and training the first image processing model according to the distillation loss.

One or more embodiments of the present disclosure provide an image processing method, and the method further includes:

in some implementations, determining the distillation loss according to the pseudo-label image and the second image includes:

determining a perceptual loss according to a feature image during a process of generating the pseudo-label image by the second image processing model and a feature image during a process of generating the second image by the first image processing model;

and taking the perceptual loss as the distillation loss.

One or more embodiments of the present disclosure provide an image processing method, and the method further includes:

in some implementations, the perceptual loss includes at least one of a feature reconstruction loss and a style reconstruction loss.

One or more embodiments of the present disclosure provide an image processing method, and the method further includes:

in some implementations, the first image processing model is trained based on steps, which further includes:

determining a total variation loss according to the second image;

accordingly, training the first image processing model according to the distillation loss includes training the first image processing model according to the distillation loss and the total variation loss.

One or more embodiments of the present disclosure provide an image processing method, and the method further includes:

in some implementations, the images generated by the second image processing model during training process further includes:

a first image generated by the second image processing model according to a labeled sample among true-label data pairs;

accordingly, if the first image processing model takes the first image as the supervision information, the first image processing model is trained based on steps including:

acquiring a labeled sample corresponding to the first image as an input of the first image processing model;

generating a third image according to the labeled sample by the first image processing model;

determining a distillation loss according to the first image and the third image;

and training the first image processing model according to the distillation loss.

According to one or more embodiments of the present disclosure, the first image processing model is applied to a lightweight terminal device.

One or more embodiments of the present disclosure provide an image processing apparatus, and the apparatus includes:

an image acquisition module, configured to acquire an original image to be processed;

an input module, configured to input the original image into a first image processing model;

a generation module, configured to process the original image by the first image processing model to generate a target image, in which the first image processing model and a second image processing model are obtained by online alternate training, supervision information during training process of the first image processing model includes at least part of images generated by the second image processing model during training process, and a model scale of the first image processing model is smaller than a model scale of the second image processing model;

and an output module, configured to output the target image.

Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. An image processing method, comprising:

acquiring an original image to be processed;

inputting the original image into a first image processing model;

processing the original image by the first image processing model to generate a target image, wherein the first image processing model and a second image processing model are obtained by online alternate training, supervision information during training process of the first image processing model comprises at least part of images generated by the second image processing model during training process, and a model scale of the first image processing model is smaller than a model scale of the second image processing model; and outputting the target image;

the second image processing model is trained based on true-label data pairs during training process, a pseudo-label image is generated according to an unlabeled sample, and the pseudo-label image is generated based on steps comprising:

acquiring an unlabeled sample as an input to the second image processing model during a process of the second image processing model and a discriminator performing adversarial training based on the true-label data pairs;

generating candidate pseudo-label images according to the unlabeled sample by the second image processing model; and screening the candidate pseudo-label images by the discriminator to obtain a final pseudo-label image.

2. The method according to claim 1, wherein the acquiring the unlabeled sample as the input to the second image processing model during the process of the second image processing model and the discriminator performing the adversarial training based on the true-label data pairs, comprises:

acquiring the unlabeled sample as the input to the second image processing model, after the second image processing model and the discriminator performing adversarial training with a preset number of true-label data pairs being acquired every time.

3. The method according to claim 1, wherein the screening the candidate pseudo-label images by the discriminator comprises:

performing authenticity evaluation on the candidate pseudo-label images by the discriminator to obtain an evaluation result; and screening the candidate pseudo-label images according to a preset evaluation criteria and the evaluation result.

4. The method according to claim 1, wherein the second image processing model and the discriminator performing the adversarial training based on the true-label data pairs comprises:

acquiring a labeled sample among the true-label data pairs as the input to the second image processing model;

generating a first image according to the labeled sample by the second image processing model;

acquiring a true-label image corresponding to the labeled sample among the true-label data pairs;

determining whether the first image and the true-label image are of a same type by the discriminator;

training the second image processing model with a goal of being determined as the same type by the discriminator; and training the discriminator with a goal of being determined as different types by the discriminator.

5. The method according to claim 4, wherein during the process of the second image processing model and the discriminator performing the adversarial training based on the true-label data pairs, the method further comprises:

determining a reconstruction loss according to the first image and the true-label image; and training the second image processing model according to the reconstruction loss.

6. The method according to claim 1, wherein if the first image processing model takes the pseudo-label image as the supervision information, the first image processing model is trained based on steps comprising:

acquiring an unlabeled sample corresponding to the pseudo-label image as an input of the first image processing model;

generating a second image according to the unlabeled sample by the first image processing model;

determining a distillation loss according to the pseudo-label image and the second image; and training the first image processing model according to the distillation loss.

7. The method according to claim 6, wherein the determining the distillation loss according to the pseudo-label image and the second image comprises:

determining a perceptual loss according to a feature image during a process of generating the pseudo-label image by the second image processing model and a feature image during a process of generating the second image by the first image processing model; and taking the perceptual loss as the distillation loss.

8. The method according to claim 7, wherein the perceptual loss comprises at least one of a feature reconstruction loss and a style reconstruction loss.

9. The method according to claim 6, wherein the first image processing model is trained based on steps, which further comprises:

determining a total variation loss according to the second image; and the training the first image processing model according to the distillation loss comprises training the first image processing model according to the distillation loss and the total variation loss.

10. The method according to claim 1, wherein the images generated by the second image processing model during training process further comprise a first image generated by the second image processing model according to a labeled sample among true-label data pairs; and if the first image processing model takes the first image as the supervision information, the first image processing model is trained based on steps comprising:

acquiring a labeled sample corresponding to the first image as an input of the first image processing model;

generating a third image according to the labeled sample by the first image processing model;

determining a distillation loss according to the first image and the third image; and training the first image processing model according to the distillation loss.

11. The method according to claim 1, wherein the first image processing model is applied to a lightweight terminal device.

12. The method according to claim 1, wherein the unlabeled sample is acquired at an interval of the adversarial training based on the true-label data pairs.

13. A non-transitory computer-readable storage medium, comprising computer-executable instructions, wherein the computer-executable instructions, when executed by a computer processor, is configured to perform an image processing method, which comprises:

acquiring an original image to be processed;

inputting the original image into a first image processing model;

processing the original image by the first image processing model to generate a target image, wherein the first image processing model and a second image processing model are obtained by online alternate training, supervision information during training process of the first image processing model comprises at least part of images generated by the second image processing model during training process, and a model scale of the first image processing model is smaller than a model scale of the second image processing model; and outputting the target image;

the second image processing model is trained based on true-label data pairs during training process, a pseudo-label image is generated according to an unlabeled sample, and the pseudo-label image is generated based on steps comprising:

acquiring an unlabeled sample as an input to the second image processing model during a process of the second image processing model and a discriminator performing adversarial training based on the true-label data pairs;

generating candidate pseudo-label images according to the unlabeled sample by the second image processing model; and screening the candidate pseudo-label images by the discriminator to obtain a final pseudo-label image.

14. An electronic device, comprising:

one or more processors; and a storage apparatus, configured to store one or more programs, wherein when the one or more programs are executed by the one or more processors, the one or more processors are caused to implement an image processing method, which comprises:

acquiring an original image to be processed;

inputting the original image into a first image processing model;

processing the original image by the first image processing model to generate a target image, wherein the first image processing model and a second image processing model are obtained by online alternate training, supervision information during training process of the first image processing model comprises at least part of images generated by the second image processing model during training process, and a model scale of the first image processing model is smaller than a model scale of the second image processing model; and outputting the target image;

the second image processing model is trained based on true-label data pairs during training process, a pseudo-label image is generated according to an unlabeled sample, and the pseudo-label image is generated based on steps comprising:

acquiring an unlabeled sample as an input to the second image processing model during a process of the second image processing model and a discriminator performing adversarial training based on the true-label data pairs;

generating candidate pseudo-label images according to the unlabeled sample by the second image processing model; and screening the candidate pseudo-label images by the discriminator to obtain a final pseudo-label image.

15. The electronic device according to claim 14, wherein the acquiring the unlabeled sample as the input to the second image processing model during the process of the second image processing model and the discriminator performing the adversarial training based on the true-label data pairs, comprises:

acquiring the unlabeled sample as the input to the second image processing model, after the second image processing model and the discriminator performing adversarial training with a preset number of true-label data pairs being acquired every time.

16. The electronic device according to claim 14, wherein the screening the candidate pseudo-label images by the discriminator comprises:

performing authenticity evaluation on the candidate pseudo-label images by the discriminator to obtain an evaluation result; and screening the candidate pseudo-label images according to a preset evaluation criteria and the evaluation result.

17. The electronic device according to claim 14, wherein the second image processing model and the discriminator performing the adversarial training based on the true-label data pairs comprises:

acquiring a labeled sample among the true-label data pairs as the input to the second image processing model;

generating a first image according to the labeled sample by the second image processing model;

acquiring a true-label image corresponding to the labeled sample among the true-label data pairs;

determining whether the first image and the true-label image are of a same type by the discriminator;

training the second image processing model with a goal of being determined as the same type by the discriminator; and training the discriminator with a goal of being determined as different types by the discriminator.

18. The electronic device according to claim 17, wherein during the process of the second image processing model and the discriminator performing the adversarial training based on the true-label data pairs, the method further comprises:

determining a reconstruction loss according to the first image and the true-label image; and training the second image processing model according to the reconstruction loss.

19. The electronic device according to claim 14, wherein if the first image processing model takes the pseudo-label image as the supervision information, the first image processing model is trained based on steps comprising:

acquiring an unlabeled sample corresponding to the pseudo-label image as an input of the first image processing model;

generating a second image according to the unlabeled sample by the first image processing model;

determining a distillation loss according to the pseudo-label image and the second image; and training the first image processing model according to the distillation loss.

* * * * *